United States Patent [19]

Kummer

[11] 4,160,068
[45] Jul. 3, 1979

[54] STORAGE BATTERY

[75] Inventor: Joseph T. Kummer, Ypsilanti, Mich.

[73] Assignee: Ford Motor Company, Dearborn, Mich.

[21] Appl. No.: 962,579

[22] Filed: Nov. 21, 1978

[51] Int. Cl.$^2$ ............................................... H01M 2/12
[52] U.S. Cl. ..................................... 429/82; 429/131; 429/140
[58] Field of Search ................ 429/131, 133, 136–141, 429/209, 82

[56] References Cited

U.S. PATENT DOCUMENTS 3,661,644  5/1972  Arrance ................................ 429/140

Primary Examiner—Charles F. LeFevour
Attorney, Agent, or Firm—William E. Johnson; Keith L. Zerschling

[57] ABSTRACT

A high power, low total energy storage battery is disclosed. The basic portion of the battery is a honeycomb separator which defines a plurality of rather small compartments. Alternate compartments throughout the separator are made to be anode compartments or cathode compartments by inserting electrodes, electrolyte and electrochemical materials in the various compartments. A preferred honeycomb separator is the honeycomb structure used as a support for an automotive exhaust catalyst.

10 Claims, 4 Drawing Figures

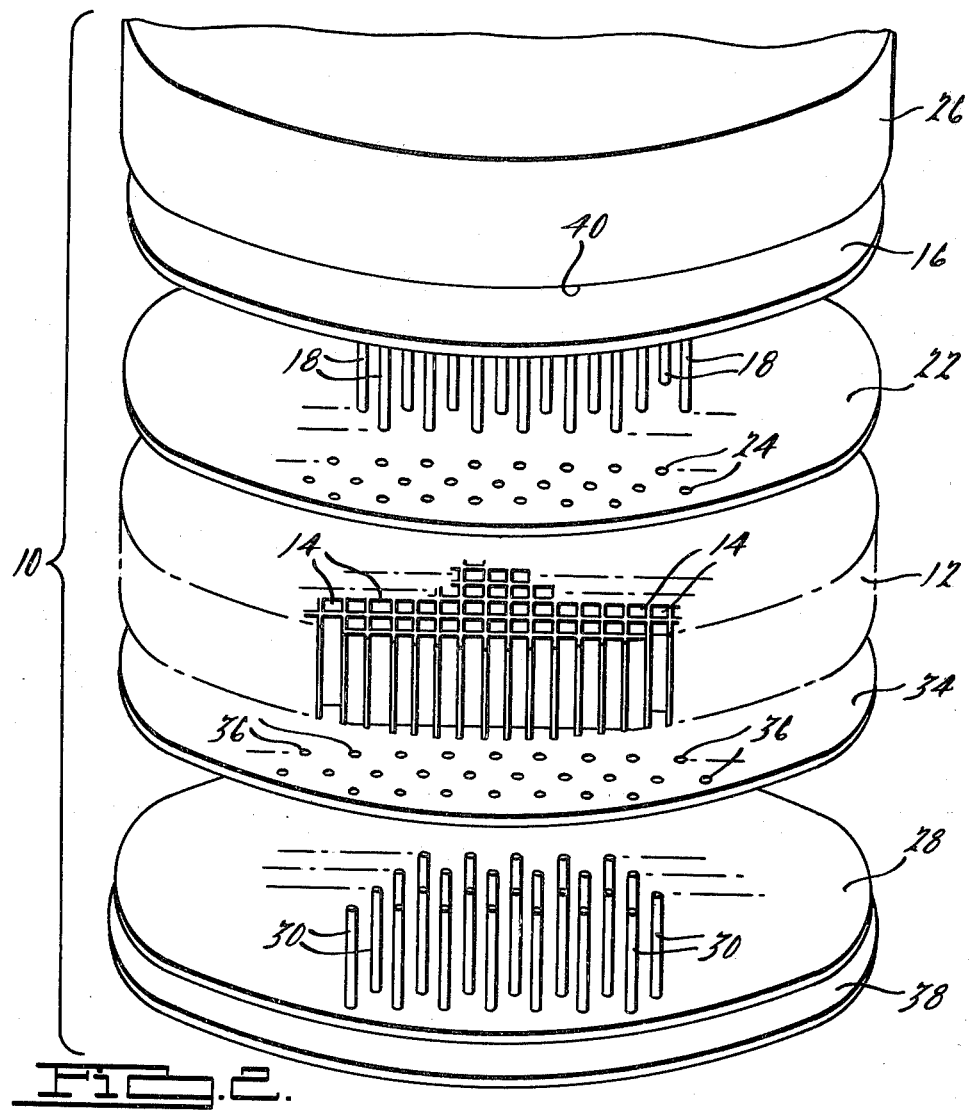
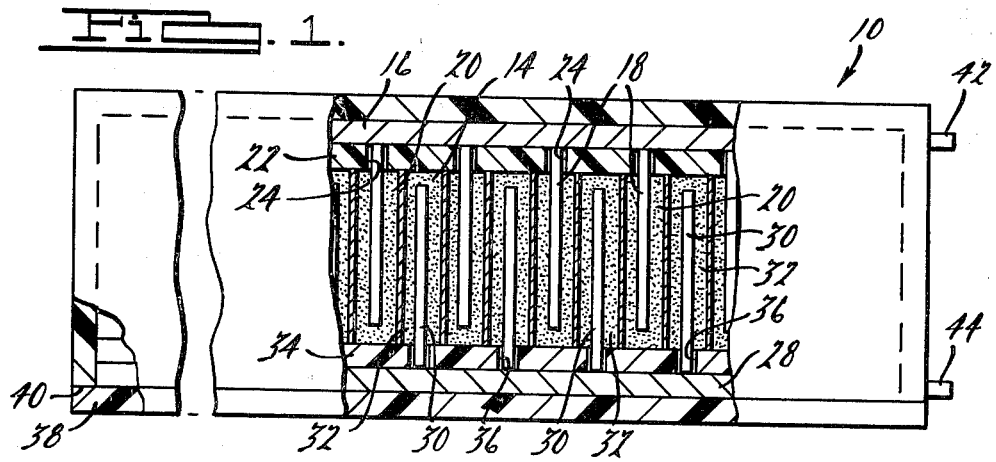
FIG. 2.
FIG. 1.

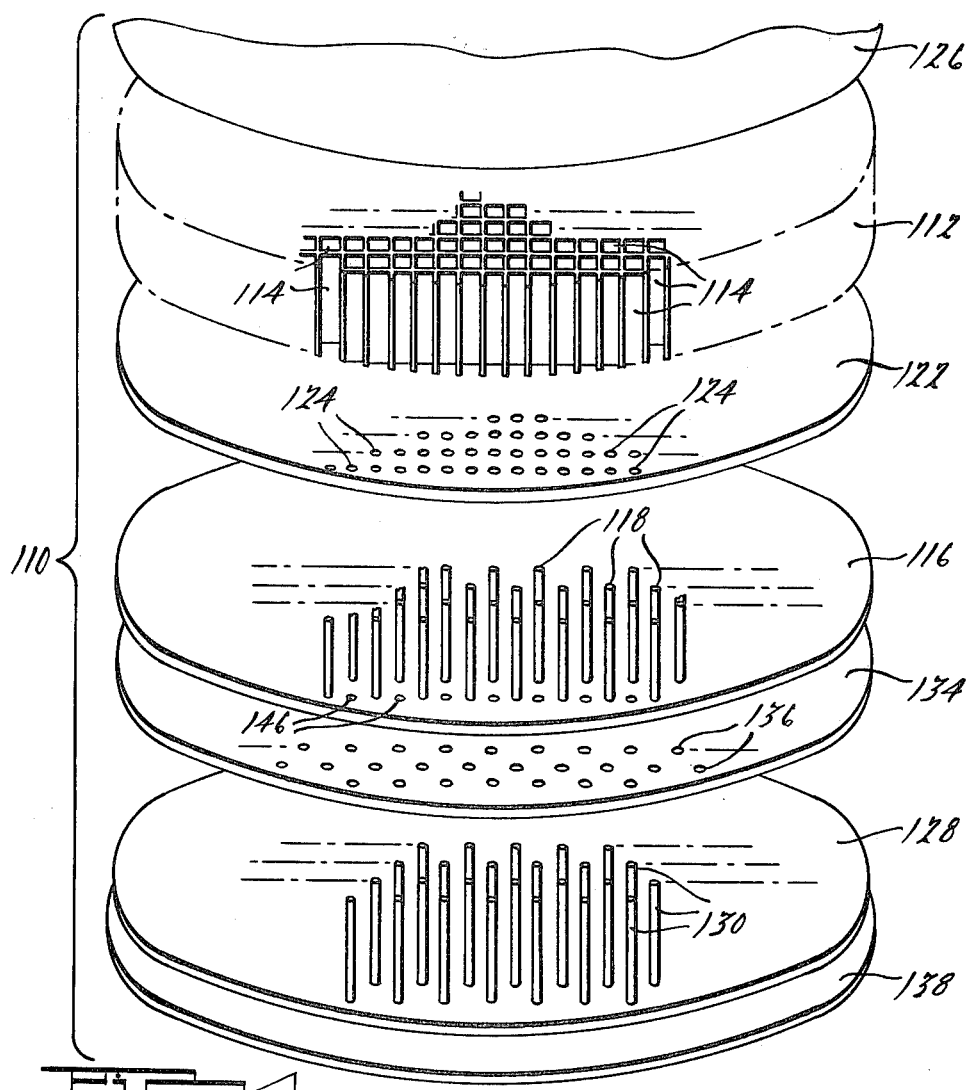
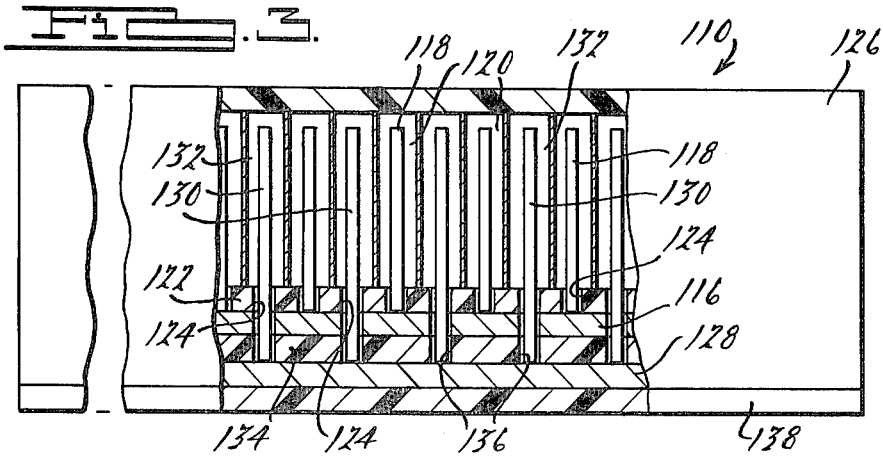

STORAGE BATTERY

BACKGROUND OF THE INVENTION AND PRIOR ART STATEMENT

The present honeycomb structure used by the Ford Motor Company as a substrate for auto exhaust catalysts have approximately 47 openings per square centimeter of front face surface. These substrates are manufactured from a ceramic material, essentially cordierite, and are made by an extrusion process. The resultant honeycomb has a plurality of cells which run the axial length of the honeycomb. These cells have a square cross section with an inside dimension of about 1.1 mm and are separated from one another by walls that are 150-250 micron thick. These cell walls are approximately 35-40% porous with the pores having an average diameter of about 10 microns.

It struck me that such a honeycomb structure could be used as a separator to form a high power, low total energy storage battery. The honeycomb separator will be used in a manner such that its cells define a plurality of separate anode and cathode compartments. With alternate cells being anode and cathode compartments, the structure allows for a high interface area between opposite electrodes with considerable strength. The power available from such a battery can be high if it is limited only by the electrolyte resistance in the passageway walls. Thus, by using such a honeycomb structure as a separator for a battery, a high power, low total energy storage battery may be constructed in a simple and efficient manner. Such a battery may be used in those situations where a large burst of power for a relatively short period of time is desired. One such application is the actuation of the starting motor for a motor vehicle.

Prior to the development of the specific type of structure proposed herein for a high power, low total energy storage battery, I was aware of such battery structures as thin flat plates which have the same characteristics. However, the prior known type of battery structure is different from that presently proposed in that the presently proposed structure has a much greater surface area between opposite electrodes.

I am unaware of any other proposals to use such honeycomb separators as the device for defining the anode and cathode compartments of a high power, low total energy storage battery. Prior art searches on my proposed system revealed no prior art of significant interest.

SUMMARY OF THE INVENTION

This application discloses a storage battery, more particularly, a storage battery having a high power, but a low total stored energy.

In accordance with the general teachings of this invention, the storage battery is formed by the following structure. A honeycomb separator is provided which has a plurality of cells therein. The cell density and cell wall size may be varied to fit design requirements. The cells of the honeycomb separator define a plurality of separate anode and cathode compartments. The honeycomb separator is formed of a material having a porosity in the range which permits ions of electrolyte to flow therethrough, but does not permit flow of electrochemical materials therethrough. The honeycomb material must also be resistant to attack by the materials forming the battery.

An anode is formed in the shape of a base with a plurality of projecting electrodes extending therefrom. These projecting electrodes have a cross section smaller than the cross section of the cells of the honeycomb separator. The electrodes of the anode are received in a plurality of the cells of the honeycomb separator to form anode compartments.

A cathode is formed in the shape of a base with a plurality of projecting electrodes extending therefrom. These projecting electrodes also have a cross section smaller than the cross section of the cells of the honeycomb separator. The electrodes are received in a plurality of the cells of the honeycomb separator to form cathode compartments. The projecting electrodes of the anode and the projecting electrodes of the cathode are so arranged in association with the cells of the honeycomb separator that the anode and the cathode compartments are in a side-by-side relationship throughout the honeycomb separator. A sealing and electrical insulating device is provided for sealing off the ends of the anode and the cathode compartments to make them fluid tight. The sealing device does let generated gas escape therefrom. This device also electrically insulates the anode from the cathode.

An electrolyte and an anodic electrochemical material are provided in each of the anode compartments. In a like manner, the electrolyte and a cathodic electrochemical material are provided in each of the cathodic compartments.

A housing is provided for holding the honeycomb separator, the anode, the cathode, and the sealing and electrical insulating device, and the electrolyte, as well as electrochemical materials in an assembled condition in order to form the high power, low total energy storage battery of this invention.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in conjunction with the accompanying drawings, wherein like reference characters indicate like parts throughout the several figures, and in which:

FIG. 1 is an elevational view, partly in cross section of a battery made in accordance with the teachings of this invention, FIG. 2 is the battery of FIG. 1 in a disassembled condition, FIG. 3 is an elevation view, partly in cross section, of a second embodiment of the battery of this invention, FIG. 4 is the battery of FIG. 3 in a disassembled condition.

DESCRIPTION OF THE PREFERRED EMBODIMENTS

In the drawings, two different embodiments of a high power, low total energy storage battery are shown. The first embodiment is shown in FIGS. 1 and 2 with the second embodiment shown in FIGS. 3 and 4.

In FIGS. 1 and 2 there is a high power, low total energy battery shown, generally identified by the numeral 10. The principal element of this battery is a honeycomb separator 12, best seen in FIG. 2, which has a plurality of cells 14—14 therein.

In accordance with a preferred teaching of this invention, the honeycomb separator 12 is a substrate such as is used for exhaust gas catalysts for automotive engines. A particular type of substrate manufactured by an extrusion process would have 47 cells per square centimeter of front face. The cells run the axial length of the honeycomb separator and have a square cross section with an inside dimension of 1.1 mm, and are separated from one another by walls that are 150-250 microns thick with a porosity in the range of 35-40%. The pore diameter for the porosity is generally in the range of about 10 microns. Normally, these honeycomb separators 12 are made from a ceramic material such as cordierite. In general, however, the requirements of the honeycomb separator are that it be made from a material having a porosity in the range which permits ions of electrolyte to flow therethrough, but does not permit flow of electrochemical materials therethrough. The material forming the honeycomb separator should also be resistant to attack by the materials forming the battery. Other materials which may be suitable for separators are materials such as plastics such as Teflon. Also the cell density and wall thickness may be varied to achieve the electrical battery characteristics desired.

An anode 16 has a plurality of projecting electrodes 18 extending therefrom. In the case of the embodiment shown in FIG. 1, the anode forms an upper electrode with the electrodes 18 extending downwardly therefrom. The anode is formed of a suitable electrically conductive material resistant to the electrolyte, such as lead if the electrolyte is sulfuric acid, allowing it to provide the electrical circuit to anode compartments. The electrodes 18 of the anode 16 are formed in checkerboard pattern so that they can be received in every other one of the cells 14 in a checkerboard fashion in order to define individual anode compartments 20, shown only in FIG. 1. Each of the electrodes 18 has a width dimension smaller than the associated anode compartment 20 so that it may be received therein.

An upper sealing and electrical insulating member 22 is also provided. This member has a plurality of openings 24 therein which permit the electrodes 18 of the anode 16 to pass therethrough and be received in their associated anode compartments 20—20. This upper sealing and electrical insulating member 22, which has a slight porosity to gases, seals off each of the cells 14 of the honeycomb separator 12 which are not anode compartments. This sealing insures that the liquid ingredients of the battery are not easily leaked therefrom through the upper portion thereof, but does permit generated gases to escape therefrom.

An upper housing member 26 is provided to close the battery 10 and seal the same. This sealing of the battery will be described in greater detail hereinbelow. The upper housing is slightly porous to permit generated gases to escape therefrom.

In a manner similar to the construction of the anode 16, a cathode 28 is provided which has a plurality of upstanding electrodes 30 thereon. The electrodes 30 are once again arranged in a checkerboard fashion so that they enter cells 14 of the honeycomb separator 12 which do not contain electrode 18 of the anode 16. In this manner, the electrodes 30 received in their associated cells 14 define cathode compartments 32—32. The anode compartments 20 and cathode compartments 32 are alternately arranged so that each anode compartment is surrounded by four cathode compartments throughout the main body of the honeycomb separator 12 and each cathode compartment is surrounded by four anode compartments. This is the structure which allows for a high interface area between the electrode compartments with considerable strength available.

A lower sealing and electrical insulating member 34 has a plurality of openings 36—36 therein. The openings 36—36 are so arranged that the electrodes 30 of the cathode 28 may pass therethrough to be received in the cells 14 of the honeycomb separator 12 to define the aforementioned cathode compartments 32—32. The upper sealing and electrical insulating member 22, and the lower sealing and electrical insulating member 34 may be made from a material such as a plastic (Teflon) or elastomer (silicone rubber).

A base 38 forms the bottom of the battery 10. This base has a lower circumferential edge 40 of the upper housing member 26 bonded to an upper surface thereof so as to seal the battery together as a package. This is shown in FIG. 1. The battery 10 also has external electrodes 42 and 44 respectively connected to the anode 16 and the cathode 28 so as to provide power to the exterior of the battery.

In accordance with the teachings of the preferred embodiment of this structure, the battery is a lead acid battery. In that case, in a charged condition, the anode compartment contains small granular particles of lead, and the cathode compartment contain small granular particles of lead dioxide. The electrolyte found in the compartments is sulphuric acid. Operation of such a lead acid battery is well known in the art and no further discussion thereof will be undertaken. It may be most practical to initially put lead monoxide particles in both anode and cathode compartments and, thereafter, when the battery is charged, the lead monoxide is changed to lead in the anode compartments and to lead dioxide in the cathode compartments.

Any other of the well known types of electrochemical materials may be used in these various compartments in order to effectuate the structure of my invention.

If a lead acid structure is built, the resistance of the electrolyte in the honeycomb separator 12 is such that a 0.2 volt potential between alternate passageways of a round six inch diameter (8500 openings total on front face) and six inches tall would allow about 9000 amps to flow between alternate passageways. If the electrodes were sufficiently active to allow the cell voltage to remain at two volts at the high current density represented by the 9000 amps (approximately two amps per passageway or about 320 ma per square centimeter of passage wall surface) one could obtain 18 kilowatts from this size honeycomb for a short period of time.

One skilled in the art of designing electrochemical cells will have no difficulty in ascertaining the size or number of separator cells necessary for a particular operation in whether one or more batteries should be placed in series or in parallel in order to achieve the benefits desired. The principal benefit of the structure of my invention is that there is a very high surface area interface between the cells of each single battery permitting very high power to be extracted from the battery for short periods of time.

Having discussed the structure shown in FIGS. 1 and 2, it will be readily apparent to the reader that the structure shown in FIGS. 3 and 4 is similar to that of FIGS. 1 and 2, but that the electrodes of both the anode and the cathode extend upwardly from the bottom into the various cells of the separator in order to define the various compartments.

Attention is now directed to FIGS. 3 and 4. In this case, it should also be understood that the necessary electrochemical materials are also placed in the anode and cathode compartments, as well as electrolyte, in order to form the battery. However, for the sake of simplicity, the materials are not shown in the compartments and the only thing that will be described in association with the drawings are the specific elements which define the various compartments and see that they are sealed from one another, both from a fluid standpoint and an electrical standpoint.

Attention is now directed to FIGS. 3 and 4 in which a battery 110 is disclosed. This battery has a honeycomb separator 112 with a plurality of cells 114—114 therein. The separator 112 may be made of the same materials as previously discussed with respect to the honeycomb separator 12. An anode 116 with a plurality of electrodes 118 extending upwardly therefrom is also provided in a manner such that the electrodes 118 are in a checkerboard fashion. An upper sealing and electrical insulating member 122 has a plurality of openings 124—124 therein. As seen best in FIG. 3, the electrodes 118 of the anode 116 extend through the openings 124 of the upper sealing and electrical insulating member 112 in order to reside in individual anode compartments 120.

A cathode 128 is also provided which has a plurality of electrodes 130 extending upwardly therefrom. A lower sealing and electrical insulating member 134 also has a plurality of openings 136 therein. The electrodes 130—130 of the cathode 128 extend upwardly through the openings 136—136 in the lower sealing and electrical insulating member 134 and through openings 146 formed in the anode 116 and through some of the openings 124—124 of the upper sealing and electrical insulating member 122 so as to be received in the cells 114 of the honeycomb separator 112 to thereby define cathode compartments 132—132.

An upper housing member 126, which has a slight degree of porosity to permit the escape of generated gases therefrom, cooperates with a base 138 in order to define the housing which confines the rest of the battery structure discussed.

As in the case with the structure described in reference to FIGS. 1 and 2, the structure described in FIGS. 3 and 4 also has associated with each of the compartments an electrolyte, as well as electrochemical materials which permit the battery to operate.

While particular embodiments of the invention have been illustrated and described, it will be obvious to those skilled in the art that various changes and modifications may be made to the structure without departing from the invention, and it is intended to cover in the appended claims all such modifications and equivalents as fall within the true spirit and scope of this invention.

What is claimed is:

1. A high power, low total energy storage battery comprising:
   a honeycomb separator having a plurality of cells therein to define a plurality of separate anode and cathode compartments, said honeycomb separator being formed of a material having a porosity in the range which permits ions of electrolyte to flow therethrough, but does not permit flow of electrochemical materials therethrough, said honeycomb material also being resistant to attack by the materials forming the battery;
   an anode in the form of a base with a plurality of projecting electrodes extending therefrom having a cross section smaller than the cross section of the cells of said honeycomb separator, said electrodes being received in a plurality of said cells to form anode compartments;
   a cathode in the form of a base with a plurality of projecting electrodes extending therefrom having a cross section smaller than the cross section of said cells of said honeycomb separator, said electrodes being received in a plurality of said cells to form cathode compartments, said projecting electrodes of said anode and said cathode being so arranged in association with said cells that said anode and said cathode compartments are in a side-by-side relationship throughout said honeycomb separator;
   sealing, gas venting and electrical insulating means for sealing off the ends of said anode and cathode compartments to make them fluid tight, to permit the escape of generated gases therefrom, and to electrically insulate said anode from said cathode;
   an electrolyte in said anode compartments and said cathode compartments;
   an anodic electrochemical material in said anode compartments;
   a cathodic electrochemical material in said cathodic compartments; and
   housing means for holding said honeycomb separator, said anode, said cathode, said sealing, gas venting and electrical insulating means, said electrolyte, and said electrochemical materials in an assembled condition.

2. The storage battery of claim 1, wherein said honeycomb separator is formed from an extruded cordierite material.

3. A high power, low total energy storage battery comprising:
   a honeycomb separator having a plurality of cells therein to define a plurality of separate anode and cathode compartments, said honeycomb separator being formed of a material having a porosity in the range which permits ions of electrolyte to flow therethrough, but does not permit flow of electrochemical materials therethrough, said honeycomb material also being resistant to attack by the materials forming the battery;
   an anode located over a top surface of said honeycomb separator, said anode being in the form of a base with a plurality of projecting electrodes extending downwardly therefrom having a cross section smaller than the cross section of the cells of said honeycomb separator, said electrodes being received in a plurality of said cells to form anode compartments;
   upper fluid sealing, gas venting and electrical insulating means located between said top surface of said honeycomb separator and said base of said anode for sealing off the tops of compartments which are not anode compartments to make them fluid tight and to permit the escape of generated gases from said cells;
   a cathode located under a bottom of said honeycomb separator, said cathode being in the form of a base with a plurality of projecting electrodes extending upwardly therefrom having a cross section smaller than the cross section of said cells of said honeycomb separator, said electrodes being received in a plurality of said cells to form cathode compartments, said projecting electrodes of said anode and said cathode being so arranged in association with said cells that said anode and said cathode compartments are in a side-by-side relationship throughout said honeycomb separator;

lower sealing and electrical insulating means located between said bottom of said honeycomb separator and said base of said cathode for sealing off the bottom of said anode compartments to make them fluid tight;

an electrolyte in said anode compartments and said cathode compartments;

an anodic electrochemical material in said anode compartments;

a cathodic electrochemical material in said cathodic compartments; and housing means for holding said honeycomb separator, said anode, said upper fluid sealing, gas venting and electrical insulating means, said cathode, said lower sealing and electrical insulating means, said electrolyte, and said electrochemical materials in an assembled condition.

4. The battery structure of claim 3, wherein said anode and cathode compartments are reversed.

5. The battery of claims 3 or 4, wherein said honeycomb separator is formed from an extruded cordierite material.

6. The battery of claims 3, 4 or 5, wherein said anodic electrochemical material and said cathodic electrochemical materials are so selected as to make the battery a lead acid battery.

7. A high power, low total energy storage battery comprising:

a honeycomb separator having a plurality of cells therein to define a plurality of separate anode and cathode compartments, said honeycomb separator being formed of a material having a porosity in the range which permits ions of electrolyte to flow therethrough, but does not permit flow of electrochemical materials therethrough, said honeycomb material also being resistant to attack by materials forming the battery;

an anode located below a bottom of said honeycomb separator, said anode in the form of a base with a plurality of upwardly projecting electrodes extending therefrom having a cross section smaller than the cross section of the cells of said honeycomb separator, said electrodes being received in a plurality of said cells to form anode compartments;

a first lower sealing and electrical insulating means located between said bottom surface of said honeycomb separator and said base of said anode for sealing off said individual cells and to provide fluid tight anode compartments;

a cathode located under said bottom surface of said honeycomb separator, said cathode being in the form of a base with a plurality of upwardly projecting electrodes extending therefrom having a cross section smaller than the cross section of said cells of said honeycomb separator, said electrodes being received in a plurality of said cells to form cathode compartments, said projecting electrodes of said anode and said cathode being so arranged in association with said cells that said anode and said cathode compartments are in a sidebyside relationship throughout said honeycomb separator;

second lower sealing and electrical insulating means located between a bottom surface of said base of said anode and said base of said cathode for sealing off individual cathode compartments to make them fluid tight and for electrically insulating the anode compartments from said cathode compartments;

an electrolyte in said anode compartments and said cathode compartments;

an anodic electrochemical material in said anode compartments;

a cathodic electrochemical material in said cathodic compartments; and housing means for holding said honeycomb separator, said anode, said cathode, said first and said second lower sealing and electrical insulating means, said electrolyte, and said electrochemical materials in an assembled condition, an upper portion of said housing being gas porous to permit escape of generated gases therefrom.

8. The battery structure of claim 7, wherein said anode and cathode compartments are reversed.

9. The battery of claims 7 or 8, wherein said honeycomb separator is formed from an extruded cordierite material.

10. The battery of claims 7, 8, or 9, wherein said anodic electrochemical material and said cathodic electrochemical materials are so selected as to make the battery a lead acid battery.

* * * * *